March 5, 1935.          S. F. KELLIHER          1,993,672
SCREEN FOR PROJECTING MACHINES
Filed Feb. 20, 1934
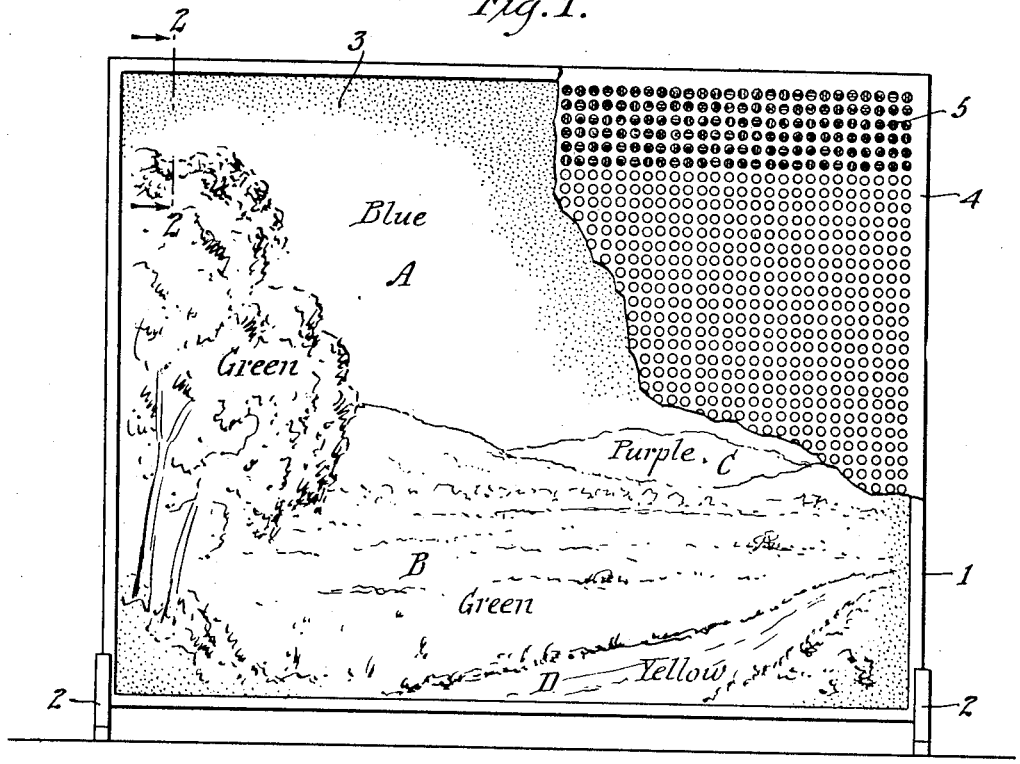
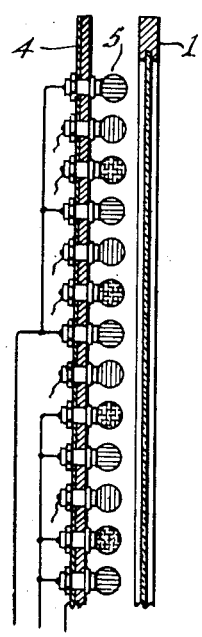
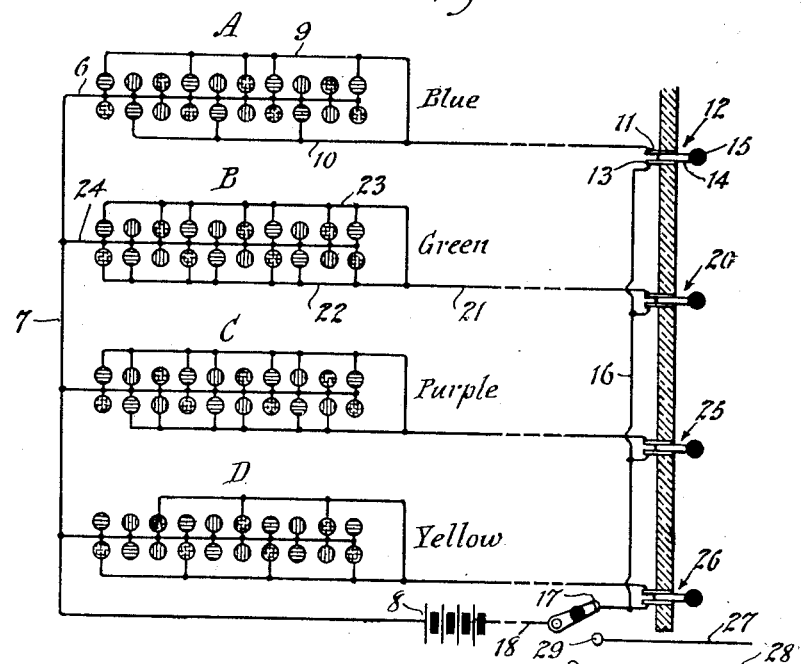
WITNESSES
INVENTOR
Sevoy F. Kelliher
BY
ATTORNEYS Patented Mar. 5, 1935

1,993,672

UNITED STATES PATENT OFFICE 1,993,672

SCREEN FOR PROJECTING MACHINES

Sevoy F. Kelliher, New Canaan, Conn.

Application February 20, 1934, Serial No. 712,230

7 Claims. (Cl. 88—24)

This invention relates to screens for projecting machines, and has for an object to provide an improved construction of screen adapted to be used with any desired form of projecting machine, and when used to present reasonably true colors on the screen though the plate or film is the ordinary black and white structure.

Another object of the invention is to provide a screen adapted to be used with projected still pictures or with moving pictures, the object being to provide shiftable colored areas so as to present the proper color for most of the objects in the picture, thereby enhancing the naturalness of the reproduction.

An additional object of the invention, more specifically is to provide a screen for projecting machines wherein a plurality of colored lights are arranged in back of the diffusing screen sheet, the same being associated with connecting conductors and switches whereby the lights may be turned on in groups or zones with specific colors for each zone, the colored zones agreeing to an appreciable extent with the natural color of the picture projected.

In the accompanying drawing—

Figure 1 is a front view of a screen disclosing an embodiment of the invention, part of the screen being broken away to show certain detailed features;

Figure 2 is an enlarged fragmentary sectional view through Figure 1 on the line 2—2;

Figure 3 is a diagram showing the various zones of lamps and associated switch mechanism.

Referring to the accompanying drawing by numerals 1 indicates a frame of any desired kind, which may be supported by the members 2 or may be suspended in any other desired manner. Frame 2 carries a screen sheet or plate 3 which may be of ground glass, translucent paper, celluloid or other translucent or semi-transparent material. Immediately in back of the screen member or sheet 3 is arranged a board 4 formed of any desired material and of substantially any desired structure which will support the various lamps 5. As shown in Fig. 1 there are numerous small lamps arranged in rows and formed with bulbs of different colors. The primary colors, red, blue and yellow have been shown but, if desired, these colors and intermediate shades may be used. As shown there is an equal number of red, blue and yellow lamps so that by using any one colored lamp a specific coloring may be produced on the screen sheet 3. By combining two or more of the colored lamps additional colors may be produced on the screen sheet 3. For instance, by using a substantially equal number of blue and yellow lamps, the shade of green may be secured. By combining a desired number of colored lamps the shade purple could be produced, as well as other shades.

In Fig. 1 there is provided the zone A which represents the sky and therefore would be illuminated by the blue lamps 4. Zone D is a road and more or less yellow so that the yellow lamps only would be used in back of this part of the picture, the yellow zone being, of course, of any size or shape. To produce the green zone blue and yellow lamps are used. If a certain shade of green is desired, an equal number of blue and yellow lamps are used, but if a different shade is desired more yellow lamps or more blue ones may be used. A desired number of blue and yellow lamps are used to produce zone B which is more or less green, and other combinations of lamps are used to produce the purple zone C. While only four zones have been disclosed in the drawing it will be evident that a greater or less number could be used according to the picture being projected, or according to the desire of the operator to produce a more varied coloring of the picture.

Where only large zones are used as shown in the drawing, the color is approximately correct for the picture, but by using a larger number of smaller zones more of the details might be brought out more exactly, for instance, the green tree could be a separate zone and could be a more vivid green than the meadow therebeneath.

As shown in Fig. 3 there are provided four groups of lamps, each group having an equal number of red, blue and yellow lamps and representing the respective zones A, B, C and D. As Fig. 2 is a section through part of the blue zone and part of the green zone, it will be seen that the upper part of the green zone, which will be seen at the upper part of the view, shows wiring utilizing only the blue lamps, while the lower part of the view shows wiring utilizing the yellow and blue lamps whereby green is produced on the screen sheet 3. As shown in Fig. 3, zone A is provided with a common return wire 6 which is connected to the main return wire 7, said main return wire being connected to a specific source of electric supply 8. Auxiliary wires 9 and 10 are connected to all of the blue lamps in zone A, said auxiliary wires extending to one side, namely, side 11, of the circuit closer or switch 12. This switch 12 consists of the sides or plates 11 and 13, said plates being of metal connected by a metal plug 14 having preferably a handle 15 of insulation. When this plug is in position the circuit is closed at this point. The supply wire 16 is connected with plate 13 and extends downwardly to contact 17. A switch 18 is provided and positioned so that one end may engage contact 17 and the other end may be connected through wire 19 to the source of current 8, whereby when switch 18 is engaging contact 17 and switch 12 is closed, current will be supplied to all of the blue lamps in zone A. At the same time current will pass through the circuit closer or switch 20 in a similar manner to switch 12 and supplies current through wire 21 to the auxiliary conductors 22 and 23 which are connected to one side of all of the blue and yellow lamps in zone B. The return wire 24 is connected to all of the lamps in zone B and to the main return wire 7.

It will thus be seen that when the switches 18 and 20 are closed current will be supplied to all of the blue and yellow lamps in zone B. The same arrangement is provided with respect to zones C and D except that all the blue and red lamps are being supplied with current, while in zone D all the yellow lamps are being supplied with current. It will thus be seen that in zones A and D the natural colors of the lamps will be diffused by the screen sheet 3, while in zones B and C the colors of the lamps will mingle to produce additional shades. When a picture is being shown, as for instance, a moving picture of the scenes illustrated in Fig. 1, the switch 18, and also the switches 12, 20, 25 and 26 are closed. If horses or people should be in the picture, and in the case of moving pictures, such objects should be moving about, there would be provided no individual color for these moving objects but they would take more or less the color of the zones in which they moved. However, the main part of the picture would be substantially truly colored and would, therefore, give a decided pleasing effect.

In case of a moving picture reel, one-third of the reel could show a background as illustrated in Fig. 1, while people or other objects moved or performed thereon. In case the background should change, for instance, if the people or other moving objects should move over into a city or other place where other colors are desirable, then the various zones A and B and C would be turned out and new colored zones turned on, said new zones coinciding with the color of the new picture. If the zone should change a second time, as for instance, to show the interior of a building or a room, the second set of lights would be turned out and a third set turned on, said third set being grouped to agree with the coloring of the various objects in the room except the moving objects. For instance, as shown in Fig. 3, there is provided a supply wire 27 which supplies current to the second arrangement of groups, and a supply wire 28 supplying current to the third arrangement of groups such as the grouping of the lights as used in a room. In the groups shown in Fig. 3, the various switches 12, 20, 25 and 26 would be continually closed, and the same is true of the other master groups, so that when the picture is first started the operator could turn switch 8 to the contact 17 so that the major groups shown would be used. As the picture progresses and moves on to the second phase, namely, the picture of a city, switch 18 could be moved over to contact 29. This would show off the various groups or zones shown in Fig. 3, while the second major groups would be lit up, said second group having been previously connected to the desired lamps to provide the desired colored zones on the screen sheet 3.

After the second section of the picture has passed and the third section begins, namely, the part showing the interior of a room, the operator will move switch 18 over to contact 30 and the second major group of lights would be turned out and the third major group lighted, thus presenting colored groups in the third section which would agree with the color of the stationary objects in the room. One, two, three or more major groups can be used for any desired reel of moving pictures, but the groups must be set up before the picture is projected for exhibition purposes, so that the operator may quickly shift the switch 18 to suit the various scenes of the film. It is evident that if the picture should move from the pictured room above mentioned back to the scene shown in Fig. 1 of the drawing, the operator could quickly swing switch 18 back to the position shown in Fig. 3 and thus quickly produce the desired colored background.

It will be understood that the screen sheet 3 and the board 4, and the arrangement of lamps 5 would always remain the same in theatres or other places where the device is used. However, for each reel some competent person would have to connect certain of the lamps together to produce zones such as A, B, C and D. This may be done in a permanent manner but preferably it is done by providing a socket and plug for each lamp so that the operator will merely plug in the desired lamps for each zone, said plug being connected with suitable cords, which in turn are connected to the auxiliary wires as desired, while one side of all of the plugs will be connected to a common return.

Various means may be used to provide circuits for the various lamps 5 so as to group them into different shaped zones so as to agree with the picture being projected.

I claim:

1. A screen for projecting machines, comprising a substantially translucent screen member, a supporting structure arranged in back of the screen member, a plurality of rows of lamps, each row comprising different colored lamps arranged in honeycomb effect at the back of the screen member carried by said supporting member, and means for lighting groups of said lamps of a given color to illuminate with a certain color zones on said screen member.

2. A screen for projecting machines, comprising a screen member only slightly transparent, and means arranged at the back of the screen member for lighting with different colors a plurality of zones on the screen member said means being formed to illuminate any of said zones with any color within the range of the device.

3. A screen for receiving pictures from a projecting machine, comprising a screen member, a plurality of colored lights arranged in back of the screen member for somewhat illuminating the screen member to change its color, and means for causing certain groups of said lights to function, certain of said groups utilizing lamps of a single color and other groups utilizing a different colored lamp, said different colors merging to produce a shade on said screen member said groups being arranged to illuminate separate zones on said screen member.

4. A screen for projecting machines, comprising a screen member formed to allow a very small amount of light to pass therethrough, and a plurality of means at the rear of the screen member for lighting more than two zones at the same time and lighting the same zones of the screen member with different colors and shades at different times.

5. A screen for projecting machines, comprising a slightly translucent screen member, a plurality of colored lamps arranged in back of the screen member, said lamps being substantially equally spaced apart, there being substantially the same number of lamps of each color, and means for turning on any desired number of lamps of a given color at a certain location to present a certain colored zone, said means being adapted to present at different times different colors on the same zone on said screen, so that the picture projected thereon will merge into the colored zone to give a natural effect to the projected picture.

6. A screen for projecting machines comprising a screen sheet formed of a substance giving the effect of ground glass, and means for providing more than two zones of color on said screen, said means being so formed that the zones of color may be changed at will.

7. A screen for projecting machines, comprising a translucent screen sheet, a plurality of rows of electric lamps arranged in back of said screen sheet, the first of the lamps of each of said rows being of a different color, the second of a different color and so on for a certain number of colors and shades, said rows of lamps being parallel and substantially in contact so that the entire rear surface of said screen will be covered, and means for switching on current to said lamps, said means being adjustable to switch current on to any desired number of lamps of a given color whereby said screen may be given one color throughout or given zones of colors of the same or varying sizes and shapes.

SEVOY F. KELLIHER.